US009795910B2

(12) United States Patent
Jinbo et al.

(10) Patent No.: US 9,795,910 B2
(45) Date of Patent: Oct. 24, 2017

(54) HONEYCOMB FILTER AND PRODUCTION METHOD FOR HONEYCOMB FILTER

(75) Inventors: Naoyuki Jinbo, Ibi-gun (JP); Akinori Orito, Ibi-gun (JP); Yuichi Nagatsu, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 369 days.

(21) Appl. No.: 14/389,359

(22) PCT Filed: Mar. 30, 2012

(86) PCT No.: PCT/JP2012/058745
§ 371 (c)(1),
(2), (4) Date: Sep. 29, 2014

(87) PCT Pub. No.: WO2013/145317
PCT Pub. Date: Oct. 3, 2013

(65) Prior Publication Data
US 2015/0121824 A1 May 7, 2015

(51) Int. Cl.
*B01D 50/00* (2006.01)
*B01D 39/06* (2006.01)
(Continued)

(52) U.S. Cl.
CPC ..... *B01D 46/2418* (2013.01); *B01D 39/2068* (2013.01); *B05D 1/12* (2013.01);
(Continued)

(58) Field of Classification Search
CPC ............... F01N 3/0222; F01N 2330/06; F01N 2330/60; F01N 2510/00; B01D 46/2474;
(Continued)

(56) References Cited

U.S. PATENT DOCUMENTS 5,549,725 A * 8/1996 Kasai ................. B01D 39/2075
210/510.1
7,122,612 B2 * 10/2006 Tao ..................... B01D 39/2075
427/226
(Continued)

FOREIGN PATENT DOCUMENTS

EP 2106835 10/2009
EP 2599534 6/2013
(Continued)

OTHER PUBLICATIONS

International Search Report for corresponding International Application No. PCT/JP2012/058745, dated May 22, 2012.
(Continued)

*Primary Examiner* — Amber R Orlando
(74) *Attorney, Agent, or Firm* — Mori & Ward, LLP

(57) ABSTRACT

An object of the present invention is to provide a honeycomb filter capable of preventing depth filtration and achieving a combination of high collection efficiency and low pressure loss. The honeycomb filter of the present invention comprises a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, wherein the filter layer is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure.

7 Claims, 9 Drawing Sheets

Cross-sectional view along line A-A

(51) Int. Cl.
| | |
|---|---|
| *B01D 39/20* | (2006.01) |
| *B01D 39/14* | (2006.01) |
| *B01D 46/24* | (2006.01) |
| *C04B 41/85* | (2006.01) |
| *C04B 35/565* | (2006.01) |
| *C04B 37/00* | (2006.01) |
| *C04B 41/00* | (2006.01) |
| *C04B 41/50* | (2006.01) |
| *F01N 3/022* | (2006.01) |
| *B05D 1/12* | (2006.01) |
| *C04B 111/00* | (2006.01) |

(52) U.S. Cl.
CPC .......... *C04B 35/565* (2013.01); *C04B 37/005* (2013.01); *C04B 41/009* (2013.01); *C04B 41/5089* (2013.01); *C04B 41/85* (2013.01); *F01N 3/0222* (2013.01); *B05D 2203/30* (2013.01); *B05D 2254/04* (2013.01); *B05D 2430/00* (2013.01); *C04B 2111/00793* (2013.01); *C04B 2235/5224* (2013.01); *C04B 2235/5445* (2013.01); *C04B 2235/5472* (2013.01); *C04B 2237/083* (2013.01); *C04B 2237/09* (2013.01); *C04B 2237/365* (2013.01); *F01N 2330/06* (2013.01); *F01N 2330/60* (2013.01); *Y02T 10/20* (2013.01)

(58) Field of Classification Search
CPC ... C04B 41/009; C04B 41/5089; C04B 41/85; C04B 2111/00793; Y02T 10/20
See application file for complete search history.

(56) References Cited

U.S. PATENT DOCUMENTS

| | | | | | |
|---|---|---|---|---|---|
| 7,541,303 | B2* | 6/2009 | Addiego | ............... | C04B 35/195 264/43 |
| 8,343,431 | B2* | 1/2013 | Tokuda | .............. | B01D 46/2425 422/180 |
| 2005/0207946 | A1* | 9/2005 | Asano | ................ | B01D 46/0001 422/177 |
| 2006/0119016 | A1* | 6/2006 | Shinohara | ............ | C04B 35/591 264/630 |
| 2007/0098914 | A1* | 5/2007 | Ingram-Ogunwumi | . | B01J 35/04 427/487 |
| 2008/0124504 | A1* | 5/2008 | Faber | .................... | C04B 35/632 428/34.4 |
| 2008/0125509 | A1* | 5/2008 | Fabian | .................. | C04B 35/195 522/34 |
| 2009/0142541 | A1 | 6/2009 | Glasson et al. | | |
| 2009/0214397 | A1* | 8/2009 | Shirono | ............. | B01D 53/9431 422/177 |
| 2010/0011726 | A1 | 1/2010 | Ishikawa | | |
| 2010/0126133 | A1* | 5/2010 | Fekety | .................... | F01N 3/035 55/523 |
| 2010/0184589 | A1* | 7/2010 | Miyairi | .............. | B01D 46/2425 502/172 |
| 2010/0189993 | A1* | 7/2010 | Mori | ........................ | C08J 7/047 428/317.5 |
| 2010/0205921 | A1* | 8/2010 | Okazaki | ............. | B01D 46/2429 55/523 |
| 2011/0147971 | A1* | 6/2011 | Spetseris | ............ | B01D 46/2418 264/40.1 |
| 2011/0274601 | A1* | 11/2011 | Boorse | ............... | B01D 53/9431 423/213.2 |
| 2011/0300335 | A1* | 12/2011 | Clinton | .............. | B01D 46/2474 428/141 |
| 2012/0009093 | A1* | 1/2012 | Mizutani | ................ | B01J 23/002 422/177 |
| 2012/0186240 | A1* | 7/2012 | Tanaka | .................. | F01N 3/0222 60/311 |
| 2012/0240541 | A1* | 9/2012 | Isoda | ................. | B01D 46/2429 55/523 |

FOREIGN PATENT DOCUMENTS

| | | |
|---|---|---|
| JP | 2004-074002 | 3/2004 |
| JP | 2007-130629 | 5/2007 |
| JP | 2008-284538 | 11/2008 |
| WO | WO 2008/066167 | 6/2008 |
| WO | WO 2010/110011 | 9/2010 |

OTHER PUBLICATIONS

Written Opinion for corresponding International Application No. PCT/JP2012/058745, dated May 22, 2012.
Extended European Search Report for corresponding EP Application No. 12873406.8-1354, dated Oct. 9, 2015.

* cited by examiner

FIG. 2
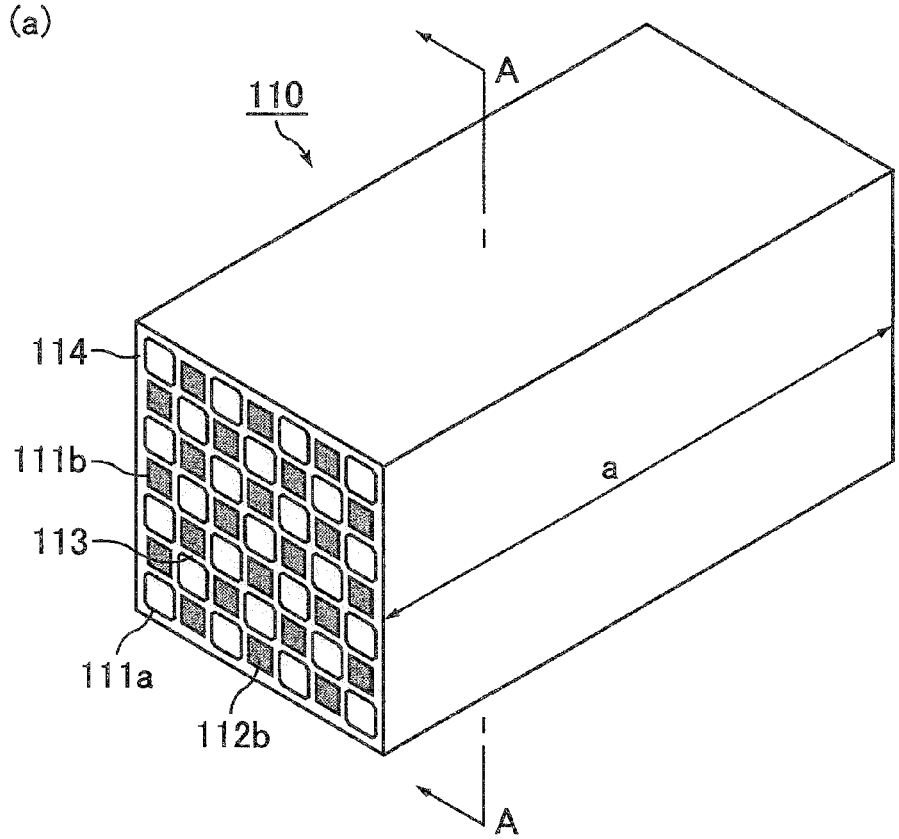
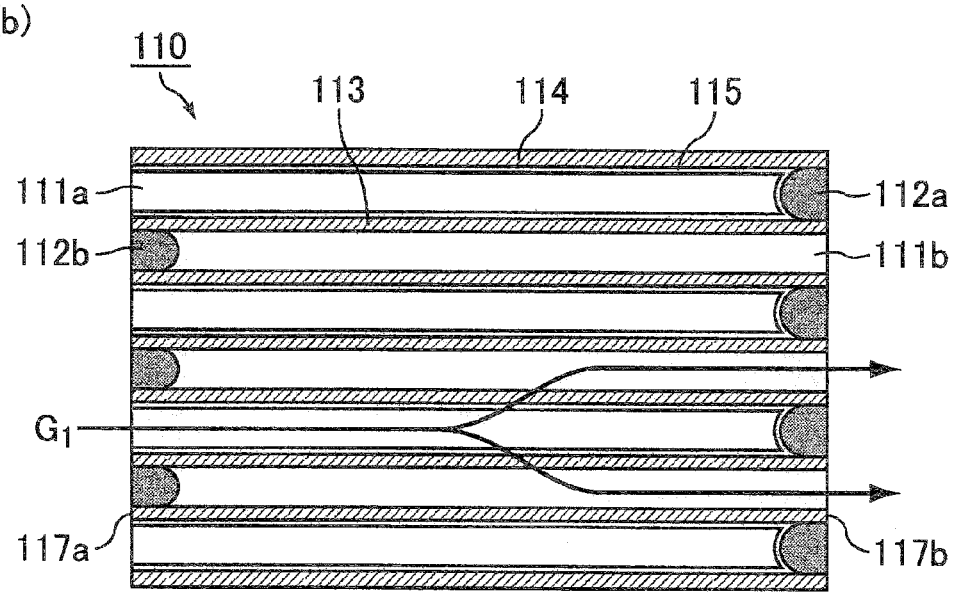
Cross-sectional view along line A-A (Arbitrary position X, Magnification 10,000×)

(Arbitrary position X, Magnification 10,000×)

(Arbitrary position Y, Magnification 10,000×)

(Arbitrary position Y, Magnification 10,000×)

FIG. 10
(a)
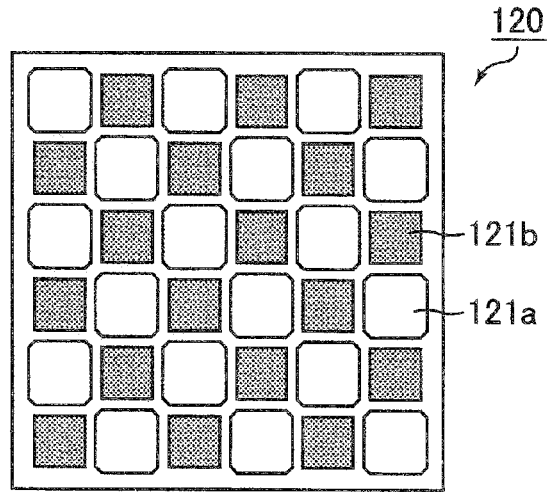
(b)
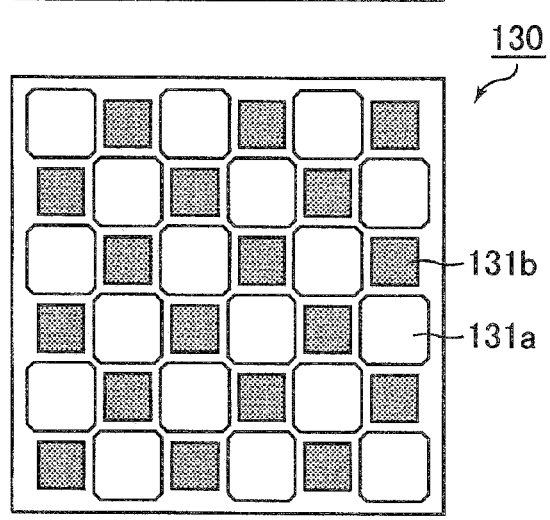
(c)
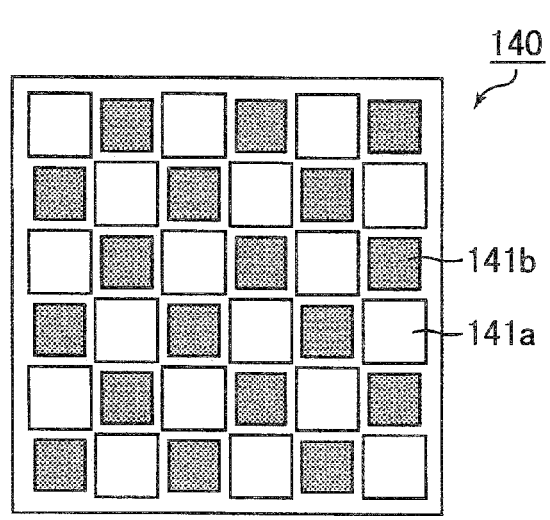

HONEYCOMB FILTER AND PRODUCTION METHOD FOR HONEYCOMB FILTER

TECHNICAL FIELD

The present invention relates to a honeycomb filter and a production method for a honeycomb filter.

BACKGROUND ART

The exhaust gas discharged from internal combustion engines such as diesel engines contains particulate matter (hereinafter also referred to as PM) such as soot and the like, and in recent years, the harm caused to people and the environment by this PM has become an issue. Furthermore, because the exhaust gas also contains harmful gas components such as CO, HC and $NO_x$, the effect of these harmful gas components on people and the environment is also a cause for concern.

Accordingly, in order to trap the PM in the exhaust gas and purge the harmful gas components, an exhaust gas cleaning device is used.

This type of exhaust gas cleaning device is prepared using a honeycomb filter composed of a material such as a ceramic. The exhaust gas can be cleaned by passing the exhaust gas through the honeycomb filter.

In a honeycomb filter used in an exhaust gas cleaning device to trap the PM in an exhaust gas, a multitude of cells separated by cell walls are disposed in parallel in the longitudinal direction, and each cell is sealed at one end section. Consequently, the exhaust gas that flows into a given cell necessarily passes through a cell wall that separates the cells, and then flows out of another cell. In other words, if this type of honeycomb filter is provided in an exhaust gas cleaning device, then the PM contained in the exhaust gas is captured by the cell walls as it passes through the honeycomb filter. Accordingly, the cell walls of the honeycomb filter function as a filter that cleans the exhaust gas.

In the initial stage of PM trapping by the honeycomb filter, the PM infiltrates the fine pores in the cell walls and is trapped inside the cell walls, generating a "depth filtration" state in which the fine pores in the cell walls are blocked. In this depth filtration state, PM continues to accumulate inside (the fine pores in) the cell walls. As a result, a problem can occur in that immediately after the trapping of PM begins, the effective porosity of the cell walls is reduced, causing the pressure loss to suddenly increase.

Patent Document 1 discloses a honeycomb filter in which a composite region is formed by depositing particles on the surface layer portions of the cell walls that constitute the honeycomb filter.

PRIOR ART DOCUMENTS

Patent Documents

Patent Document 1: WO 2010/110011 pamphlet

DISCLOSURE OF INVENTION

Problems Invention Aims to Solve

In Patent Document 1, the particles that are deposited in order to form the composite region are supplied and deposited by a gas-solid two phase flow.

With the technology described in Patent Document 1, if the particle size of the particles that constitute the composite region is large, then because the gaps between particles are large, large amounts of PM can sometimes pass through the composite region, so that the collection efficiency cannot be improved. Furthermore, if the PM that has passed through the composite region infiltrates the cell walls and is trapped inside the cell walls, then a "depth filtration" state sometimes occurs, resulting in increased pressure loss.

On the other hand, if the particle size of the particles that constitute the composite region is small, then because the gaps between particles are small, sometimes the gas cannot easily pass through the composite region, resulting in increased pressure loss. Further, the particles that constitute the composite region sometimes penetrate into the inside of the cell walls, causing a substantial "depth filtration" state and increasing the pressure loss.

The present invention has been developed in light of the above circumstances, and has objects of providing a honeycomb filter capable of preventing depth filtration and achieving a combination of high collection efficiency and low pressure loss, and providing a production method for such a honeycomb filter.

Means for Solution of the Problems

A honeycomb filter according to claim 1 comprises:
a ceramic honeycomb substrate in which a multitude of cells through which a fluid flows are disposed in parallel in a longitudinal direction and are separated by cell walls, each cell being sealed at an end section at either the fluid inlet side or the fluid outlet side, and
a filter layer which, among the surfaces of the cell walls, is formed on the surface of the cell walls of those cells in which the end section at the fluid inlet side is open and the end section at the fluid outlet side is sealed, wherein
the filter layer is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure.

In the honeycomb filter described above, the filter layer is formed on the surface of the cell walls of those cells in which the end section at the fluid inlet side is open and the end section at the fluid outlet side is sealed.

Because the exhaust gas flows into the cells from the fluid inlet side of the honeycomb filter, the PM in the exhaust gas is deposited in large amounts on the cell walls of those cells in which the end section at the fluid inlet side is open and the end section at the fluid outlet side is sealed. Accordingly, when the filter layer is formed on the surface of the cell walls of those cells in which the end section at the fluid inlet side is open and the end section at the fluid outlet side is sealed, the PM can be trapped by the filter layer, and therefore depth filtration can be prevented.

The filter layer of the honeycomb filter described above is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure.

By binding the plurality of spherical ceramic particles with the crosslinking bodies, the materials that constitute the filter layer are bound successively together, forming an overall filter layer having a configuration of spherical ceramic particle-crosslinking body-spherical ceramic particle-crosslinking body- and so on.

In the filter layer, a network structure exists in which the portions formed from the spherical ceramic particles and the crosslinking bodies can be seen as lines, and each space surrounded by the lines formed from the spherical ceramic particles and the crosslinking bodies can be seen as a single opening (pore).

A plurality of crosslinking bodies can bind to a single spherical ceramic particle, and by binding a plurality of spherical ceramic particles and crosslinking bodies in succession, a network shape is formed for the entire filter layer.

The bonds between the spherical ceramic particles and the crosslinking bodies have a variety of orientations, and the network shape is not formed as a flat shape on a specific plane, but rather is formed three-dimensionally across the thickness direction of the filter layer, and therefore the network structure adopts a three-dimensional shape.

When the filter layer is a three-dimensional network structure, pores are formed in the filter layer, and therefore the PM in the exhaust gas attempting to flow through the filter layer is easily trapped.

In other words, it can be stated that a three-dimensional network structure is well suited to the trapping of PM, and a honeycomb filter having a three-dimensional structure becomes a honeycomb filter with high collection efficiency.

Furthermore, when the filter layer is a three-dimensional network structure, because pores are formed in the filter layer, the gas components in the exhaust gas can pass through the filter layer by passing through these pores, resulting in a honeycomb filter with low pressure loss.

Further, when the spherical ceramic particles are bound to each other by crosslinking bodies, a robust filter layer is obtained in which the particles are bound strongly together.

In the filter layer, if the particles are bound weakly, then there is a possibility that the pressure applied by the exhaust gas may cause the particles that constitute the filter layer to detach, causing the filter layer to be lost.

Consequently, by employing a structure in which the spherical ceramic particles are bound together by crosslinking bodies, a robust filter layer can be obtained in which the particles are unlikely to become detached.

Furthermore, because the spherical ceramic particles are bound to other spherical ceramic particles by a plurality of crosslinking bodies, thermal stress applied to the spherical ceramic particles is dispersed across the plurality of crosslinking bodies, making detachment of the filter layer unlikely.

A honeycomb filter according to claim 2 comprises:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, wherein the filter layer is composed of a plurality of spherical ceramic particles, and crosslinking bodies which extend from one portion of the surface of an arbitrary single spherical ceramic particle among the plurality of spherical ceramic particles, and bind to an adjacent other spherical ceramic particle, and the spherical ceramic particles and the crosslinking bodies form a three-dimensional network structure.

In the honeycomb filter according to claim 2, in a similar manner to the honeycomb filter according to claim 1, the filter layer is formed on the surface of the cell walls of those cells in which the end section at the fluid inlet side is open and the end section at the fluid outlet side is sealed. As a result, depth filtration of the PM can be efficiently prevented.

Further, the filter layer is composed of a plurality of spherical ceramic particles, and crosslinking bodies which extend from one portion of the surface of an arbitrary single spherical ceramic particle among the plurality of spherical ceramic particles, and bind to an adjacent other spherical ceramic particle, and the spherical ceramic particles and the crosslinking bodies form a three-dimensional network structure.

The three-dimensional network structure can also be formed by the crosslinking bodies extending from a portion of the surface of a single spherical ceramic particle and binding to another spherical ceramic particle.

The three-dimensional network structure formed by the crosslinking bodies extending from a portion of the surface of the spherical ceramic particles is also well suited to trapping PM, and the gas components in the exhaust gas can pass through the three-dimensional network structure. Consequently, a honeycomb filter having this type of filter layer becomes a honeycomb filter with high collection efficiency and low pressure loss.

Furthermore, because a single spherical ceramic particle and an adjacent other spherical ceramic particle are bound via a crosslinking body, a robust filter layer can be obtained in which the particles are unlikely to become detached.

Moreover, because the spherical ceramic particles are bound to other spherical ceramic particles by a plurality of crosslinking bodies, thermal stress applied to the spherical ceramic particles is dispersed across the plurality of crosslinking bodies, meaning detachment of the filter layer becomes unlikely.

In a honeycomb filter according to claim 3, the crosslinking bodies are rod-shaped bodies which exist between the spherical ceramic particles and have a shape that is narrower in the central portion than at both end portions that bind to the spherical ceramic particles.

The description that the crosslinking bodies are narrower in the central portion means that the cross-sectional area at both end portions of each crosslinking body is relatively larger than the cross-sectional area in the central portion of the crosslinking body. In other words, the spherical ceramic particles and the crosslinking bodies are bound strongly by surface contact rather than point contact. When the spherical ceramic particles and the crosslinking bodies are bound strongly by surface contact, a more robust filter layer can be obtained in which particles are even less likely to become detached.

Further, the description that the crosslinking bodies are rod-shaped bodies having a shape that is narrower in the central portion means that the crosslinking bodies have formed a neck as a result of sintering. Because the bonds produced by sintering have a powerful binding force, a robust filter layer can be obtained.

Furthermore, because the spherical ceramic particles are bound to other spherical ceramic particles via a plurality of crosslinking bodies, thermal stress applied to the spherical ceramic particles is dispersed across the plurality of crosslinking bodies, meaning detachment of the filter layer becomes unlikely.

In a honeycomb filter according to claim 4, the crosslinking bodies are formed by the sintering of spherical ceramic particles with a relatively small particle size compared with the average particle size of the aforementioned spherical ceramic particles.

Further, in a honeycomb filter according to claim 5, the average particle size of the spherical ceramic particles with a relatively small particle size is less than 0.3 µm.

The spherical ceramic particles with a small particle size undergo Ostwald ripening (a phenomenon in which heating causes small particles to disappear and large particles to grow gradually larger), and the small particles are condensed into larger particles. As a result, the small particles become the crosslinking bodies that crosslink the large particles together, yielding a robust laminated body. In other words, a robust filter layer is formed. In particular, small spherical ceramic particles with an average particle size of less than 0.3 µm tend to condense easily under the heat treatment conditions used in the production method for a honeycomb filter according to the present invention, and are therefore particularly suited to the formation of a robust filter layer.

The average particle size of the particles that constitute the filter layer can be measured by the following method.

A honeycomb calcined body which constitutes a honeycomb filter is processed to prepare a sample with dimensions of 10 mm×10 mm×10 mm.

A single arbitrary position on the surface of the prepared sample is then observed using a scanning electron microscope (SEM). At this time, the conditions are set so that the particles that constitute the filter layer appear within a single field of view. Here, as SEM, model FE-SEM S-4800 manufactured by Hitachi, Ltd. can be used. Further, the imaging conditions for the SEM include an accelerating voltage of 15.00 kV, a working distance (WD) of 15:00 mm, and a magnification of 10,000×.

Next, the particle size of every particle within the single field of view is measured visually. The average value of the particle sizes of all the particles measured in the single field of view is deemed the average particle size.

In a honeycomb filter according to claim 6, the filter layer is also additionally formed on the surface of the cell walls of cells in which the end section at the fluid outlet side is open and the end section at the fluid inlet side is sealed.

When the filter layer is formed on the surface of the cell walls of those cells in which the end section at the fluid outlet side is open and the end section at the fluid inlet side is sealed, even if PM passes through the cell walls, this PM can be trapped by the above filter layer, and therefore the collection efficiency can be further enhanced.

In a honeycomb filter according to claim 7, the spherical ceramic particles are heat-resistant oxide ceramic particles, and in a honeycomb filter according to claim 8, the heat-resistant oxide ceramic particles are at least one type selected from the group consisting of alumina, silica, mullite, ceria, zirconia, cordierite, zeolite and titania.

When the filter layer is composed of heat-resistant oxide ceramic particles, then even when a regeneration treatment is performed to incinerate the PM, problems such as melting of the filter layer do not occur. As a result, a honeycomb filter having excellent heat resistance can be obtained.

In a honeycomb filter according to claim 9, pores are formed as a result of the spherical ceramic particles and the crosslinking bodies forming a three-dimensional network structure, and the average pore size of the pores is larger than the average particle size of the spherical ceramic particles.

The fact that the average pore size of the pores formed as a result of the formation of the three-dimensional network structure is larger than the average particle size of the spherical ceramic particles indicates that the pores provided in the filter layer are sufficiently large that the gas components of the exhaust gas can pass through the filter layer.

In other words, a honeycomb filter is obtained in which the increase in pressure loss due to the provision of the filter layer is small.

A production method for a honeycomb filter according to claim 10 is a production method for a honeycomb filter comprising:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, in which the filter layer is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure, the production method comprising:

a honeycomb calcined body production step of producing, from ceramic powders, a porous honeycomb calcined body in which a multitude of cells are disposed in parallel in a longitudinal direction and are separated by cell walls, each cell being sealed at an end section at either the fluid inlet side or the fluid outlet side, a droplet dispersion step of dispersing droplets containing a raw material of the spherical ceramic particles in a carrier gas, a drying step of drying the carrier gas at 100 to 800° C., thereby forming spherical ceramic particles from the droplets containing the raw material of the spherical ceramic particles, an inflow step of introducing the carrier gas into those cells in which the end section at the fluid inlet side is open and the end section at the fluid outlet side is sealed, and depositing the spherical ceramic particles on the surface of the cell walls, and a heating step of heating the ceramic honeycomb substrate to 1100 to 1500° C.

In the production method described above, the droplets containing the raw material of the spherical ceramic particles are dispersed in the carrier gas, and the carrier gas is dried at 100 to 800° C. By drying the carrier gas, the moisture within the droplets dispersed in the carrier gas can be removed to form the spherical ceramic particles. Further, when the raw material of the spherical ceramic particles contained in the carrier gas is a precursor to a heat-resistant oxide, the precursor to the heat-resistant oxide can be converted to spherical ceramic particles in the drying step.

The thus produced spherical ceramic particles are introduced into the cells, the spherical ceramic particles are deposited on the cell walls, and then the heating step of heating the ceramic honeycomb substrate to 1100 to 1500° C. is performed. Some of the spherical ceramic particles undergo sintering in the heating step, and become crosslinking bodies that bind spherical ceramic particles to each other by crosslinking the spherical ceramic particles, meaning a filter layer with a three-dimensional network structure can be obtained.

In a production method for a honeycomb filter according to claim 11, in the droplet dispersion step, the droplets are dispersed in the carrier gas by spraying.

By using spraying to disperse the droplets, spherical droplets can be produced. Because the particles obtained from spherical droplets are also spherical, dispersion by spraying is well suited to producing spherical ceramic particles.

In a production method for a honeycomb filter according to claim 12, the droplets include, as a raw material of the spherical ceramic particles, a heat-resistant oxide precursor that becomes a heat-resistant oxide upon heating.

If a heat-resistant oxide precursor is included in the droplets, particles of a heat-resistant oxide can be obtained by heating the carrier gas. By introducing the particles of heat-resistant oxide into the cells, a filter layer composed of heat-resistant oxide particles can be formed.

In other words, a honeycomb filter of the present invention is as described below.

1. A honeycomb filter, comprising:
a ceramic body having a plurality of through holes extending in parallel in a longitudinal direction of the ceramic body and a plurality of cell wall portions partitioning the through holes, the plurality of through holes forming a plurality of inlet cells sealed at an outlet end of the ceramic body and a plurality of outlet cells sealed at an inlet end of the ceramic body such that the plurality of cell wall portions is configured to filter a fluid flowing from the inlet cells into the outlet cells,
wherein the ceramic body has a plurality of auxiliary filter layers comprising a ceramic material and formed on surfaces of the cell wall portions in the inlet cells, respectively, the plurality of auxiliary filter layers has three-dimensional network structures formed of the ceramic material, and each of the three-dimensional network structures has a plurality of particulate ceramic portions and a plurality of linking ceramic portions linking the particulate ceramic portions.
2. The honeycomb filter according to claim 1, wherein the plurality of auxiliary filter layers is obtained by forming on the surfaces of the cell wall portions in the inlet cells three-dimensional network structures comprising a plurality of primary ceramic particles and a plurality of secondary ceramic particles having average particle diameters smaller than average particle diameters of the primary ceramic particles and sintering the three-dimensional network structure such that the plurality of auxiliary filter layers having the three-dimensional network structures having the particular ceramic portions and the linking ceramic portions linking the particular ceramic portions is formed on the surfaces of the cell wall portions in the inlet cells, respectively.
3. The honeycomb filter according to claim 1, wherein the particular ceramic portions have an average particle diameter which is greater than an average width of the linking ceramic portions.
4. The honeycomb filter according to claim 1, wherein the particular ceramic portions have an average particle diameter which is greater than an average length of the linking ceramic portions.
5. The honeycomb filter according to claim 1, wherein the particular ceramic portions are linked through the linking ceramic portions such that the three-dimensional network structures have pores forming an average pore diameter which is greater than an average diameter of the particular ceramic portions.
6. The honeycomb filter according to claim 1, wherein the ceramic material of the auxiliary filter layer is an oxide.
7. The honeycomb filter according to claim 1, wherein the ceramic material of the auxiliary filter layers is an oxide ceramic.
8. The honeycomb filter according to claim 1, wherein the ceramic material of the auxiliary filter layers is at least one ceramic selected from the group consisting of alumina, silica, mullite, zirconia, cordierite, zeolite and titania.

BRIEF DESCRIPTION OF THE DRAWINGS

FIG. 2(a) is a perspective view schematically illustrating an example of a honeycomb calcined body that constitutes the honeycomb filter illustrated in FIG. 1. FIG. 2(b) is a cross-sectional view along the line A-A of the honeycomb calcined body illustrated in FIG. 2(a).

FIG. 10(a), FIG. 10(b) and FIG. 10(c) are side views schematically illustrating examples of the cell structure of the honeycomb calcined body that constitutes the honeycomb filter according to the first embodiment of the present invention.

EMBODIMENTS FOR CARRYING OUT THE INVENTION

A more detailed description of embodiments of the present invention is provided below. However, the present invention is not limited to the embodiments described below, and various modifications can be made without departing from the scope of the present invention.
(First Embodiment)

Embodiments of a honeycomb filter of the present invention and a production method for the honeycomb filter are described below as a first embodiment of the present invention.

In a honeycomb filter according to the first embodiment of the present invention, a ceramic honeycomb substrate (ceramic block) is composed of a plurality of honeycomb calcined bodies. Further, the multitude of cells of the honeycomb calcined bodies that constitute the honeycomb filter include large volume cells and small volume cells, and the area of a large volume cell in a cross section perpendicular to the longitudinal direction is larger than the area of a small volume cell in a cross section perpendicular to the longitudinal direction.

The honeycomb filter according to the first embodiment of the present invention has a filter layer formed on the surface of the cell walls of the ceramic honeycomb substrate comprising the honeycomb calcined bodies.

In this specification, a structure without a filter layer formed on the surface of the cell walls is referred to as a "ceramic honeycomb substrate", and a structure with a filter layer formed on the surface of the cell walls is referred to as a "honeycomb filter", thereby distinguishing between the two.

Furthermore, in the following description, references which simply mention a cross section of a honeycomb calcined body indicate a cross section perpendicular to the longitudinal direction of the honeycomb calcined body. Similarly, references which simply mention the cross-sectional area of a honeycomb calcined body indicate the area of a cross section perpendicular to the longitudinal direction of the honeycomb calcined body.

Figure 1:
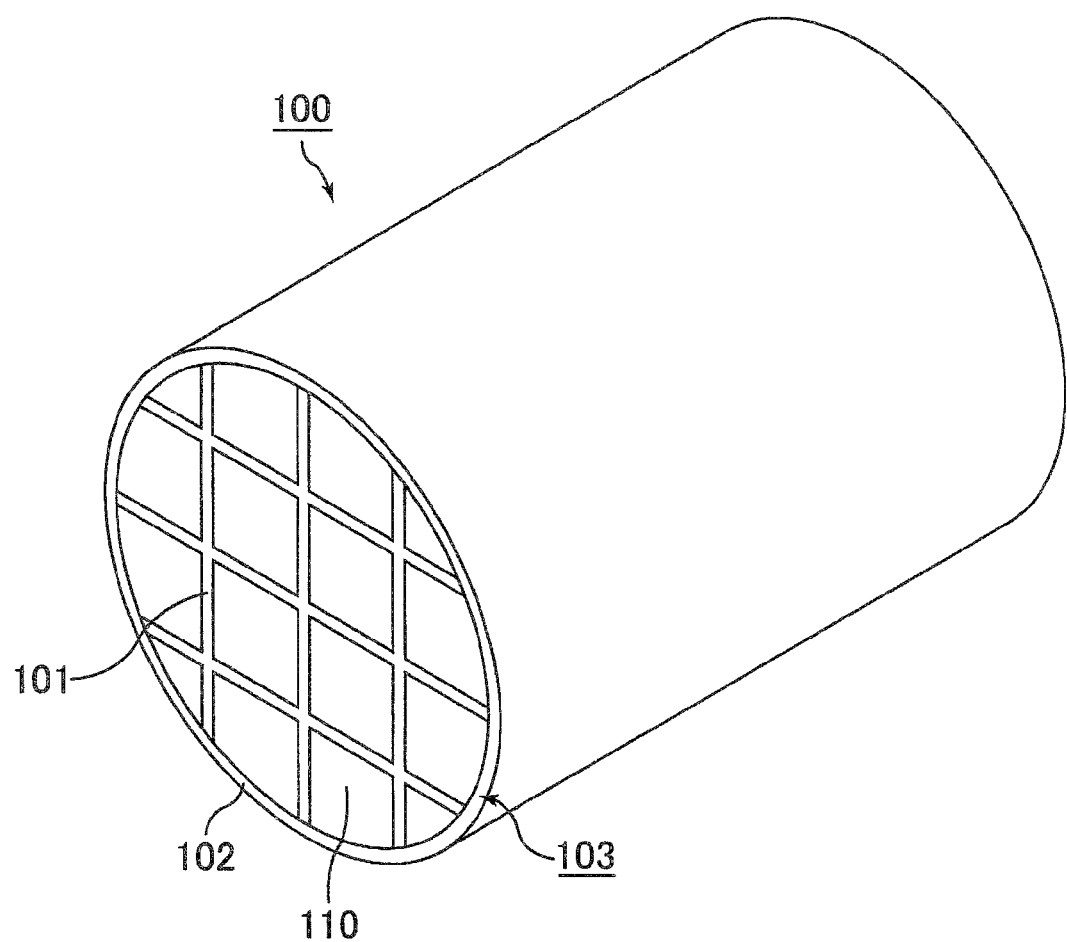
FIG. 1 is a perspective view schematically illustrating an example of a honeycomb filter according to a first embodiment of the present invention.

FIG. 1 is a perspective view schematically illustrating an example of the honeycomb filter according to the first embodiment of the present invention.

FIG. 2(a) is a perspective view schematically illustrating an example of a honeycomb calcined body that constitutes the honeycomb filter illustrated in FIG. 1. FIG. 2(b) is a cross-sectional view along the line A-A of the honeycomb calcined body illustrated in FIG. 2(a).

In the honeycomb filter 100 illustrated in FIG. 1, a plurality of honeycomb calcined bodies 110 are bundled together via adhesive material layers 101 to form a ceramic honeycomb substrate (ceramic block) 103, and an outer periphery coating layer 102 for preventing leakage of the exhaust gas is formed around the outer periphery of this ceramic honeycomb substrate (ceramic block) 103. The outer periphery coating layer may be formed as needed.

This type of honeycomb filter formed by bundling a plurality of honeycomb calcined bodies is also called an aggregated type honeycomb filter.

Although described in more detail below, the honeycomb calcined bodies 110 which constitute the honeycomb filter 100 are preferably porous bodies formed from silicon carbide or a silicon-containing silicon carbide.

In the honeycomb calcined body 110 illustrated in FIG. 2(a) and FIG. 2(b), a multitude of cells 111a and 111b are disposed in parallel in the longitudinal direction (the direction of arrow a in FIG. 2(a)) and are separated by cell walls 113, and an outer peripheral wall 114 is formed at the outer periphery. One end section of each of the cells 111a and 111b is sealed by a sealing material 112a or 112b.

As illustrated in FIG. 2(b), a filter layer 115 is formed on the surface of the cell walls 113 of the honeycomb calcined body 110. The filter layer 115 is not shown in the honeycomb calcined body 110 illustrated in FIG. 2(a).

In the honeycomb calcined body 110 illustrated in FIG. 2(a) and FIG. 2(b), large volume cells 111a having a cross-sectional area perpendicular to the longitudinal direction that is relatively larger than that of small volume cells 111b, and small volume cells 111b having a cross-sectional area perpendicular to the longitudinal direction that is relatively smaller than that of the large volume cells 111a are arranged alternately.

The shape of the large volume cells 111a in a cross section perpendicular to the longitudinal direction is substantially octagonal, whereas the shape of the small volume cells 111b in a cross section perpendicular to the longitudinal direction is substantially tetragonal.

In the honeycomb calcined body 110 illustrated in FIG. 2(a) and FIG. 2(b), the end sections of the large volume cells 111a on a first end surface 117a side of the honeycomb calcined body 110 are open, and the end sections on a second end surface 117b side are sealed by the sealing material 112a. On the other hand, the end sections of the small volume cells 111b on the second end surface 117b side of the honeycomb calcined body 110 are open, and the end sections on the first end surface 117a side are sealed by the sealing material 112b.

Accordingly, as illustrated in FIG. 2(b), an exhaust gas $G_1$ introduced into a large volume cell 111a (in FIG. 2(b), the exhaust gas is indicated by $G_1$, and the flow of the exhaust gas is indicated by the arrows) necessarily flows out from a small volume cell 111b after passing through the cell wall 113 that separates the large volume cell 111a from the small volume cell 111b. Because the PM and the like in the exhaust gas $G_1$ is trapped when the exhaust gas $G_1$ passes through the cell wall 113, the cell walls 113 that separate the large volume cells 111a and the small volume cells 111b function as filters.

In this manner, gases such as exhaust gases can be passed through the large volume cells 111a and the small volume cells 111b of the honeycomb calcined body 110. When a gas such as an exhaust gas is introduced in the direction illustrated in FIG. 2(b), the end section on the first end surface 117a side of the honeycomb calcined body 110 (the end section where the small volume cells 111b are sealed) is called the fluid inlet side end section, and the end section on the second end surface 117b side of the honeycomb calcined body 110 (the end section where the large volume cells 111a are sealed) is called the fluid outlet side end section.

In other words, the large volume cells 111a in which the end section at the fluid inlet side is open can be called fluid inlet side cells 111a, and the small volume cells 111b in which the end section at the fluid outlet side is open can be called fluid outlet side cells 111b.

The filter layer is described below.

The filter layer is formed by sintering a portion of the spherical ceramic particles.

Figure 3:
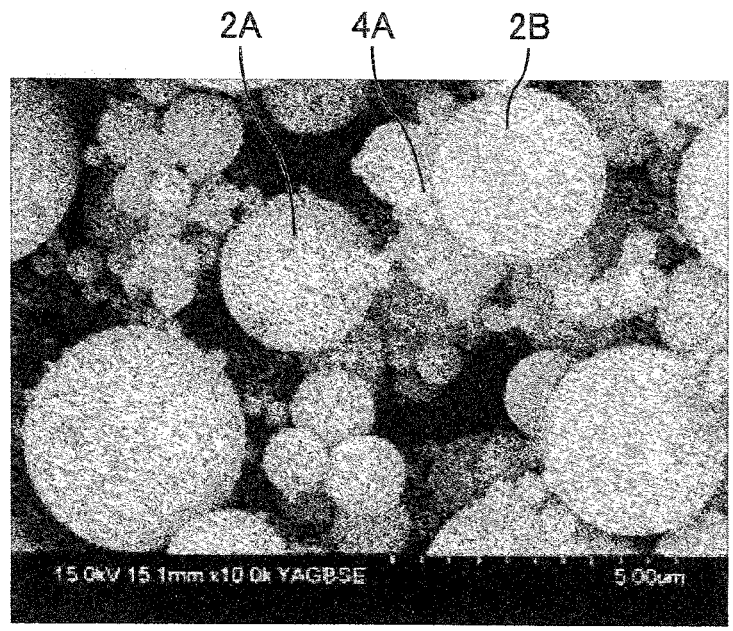
FIG. 3 is a microscope photograph, taken at an arbitrary position X, showing a filter layer before a portion of the spherical ceramic particles are sintered.

FIG. 3 is a microscope photograph, taken at an arbitrary position X, showing the filter layer before a portion of the spherical ceramic particles are sintered. The magnification is 10,000×.

In the filter layer shown in FIG. 3, spherical ceramic particles 2A and spherical ceramic particles 2B with relatively large particle sizes, and spherical ceramic particles 4A with relatively small particle sizes exist independently.

Figure 4:
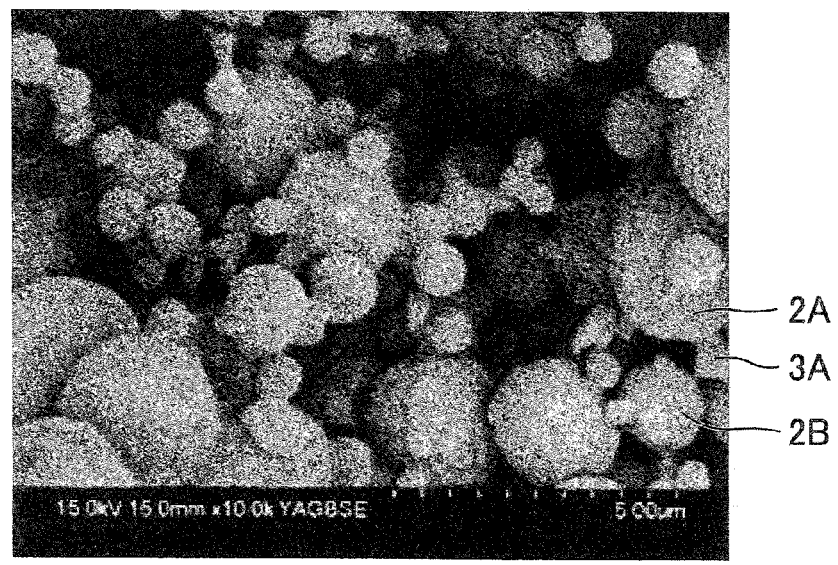
FIG. 4 is an electron microscope photograph of the filter layer taken at an arbitrary position X.

FIG. 4 is an electron microscope photograph of the filter layer taken at an arbitrary position X. The magnification is 10,000×.

The filter layer shown in FIG. 4 is a photograph of the sintered filter layer taken at an arbitrary position X. Note that the images before and after sintering are not of the same position.

The filter layer shown in FIG. 4 is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure.

In FIG. 4, the spherical ceramic particles and the crosslinking bodies are indicated as spherical ceramic particles 2A, spherical ceramic particles 2B, and crosslinking bodies 3A.

Based on FIG. 4, it is evident that the spherical ceramic particles 4A with the relatively small particle size shown in FIG. 3 transform to become the crosslinking bodies 3A which bind the spherical ceramic particles 2A and the spherical ceramic particles 2B by crosslinking the spherical ceramic particles 2A and the spherical ceramic particles 2B.

In the filter layer before a portion of the spherical ceramic particles are sintered, the average particle size of the spherical ceramic particles with a relatively small particle size is preferably less than 0.3 µm.

Further, the average particle size of the spherical ceramic particles with a relatively large particle size is preferably 0.3 µm or greater, and preferably not more than 6.0 µm.

The variation in the particle size distribution of the particles that constitute the filter layer before and after the heating step is described below.

Figure 5:
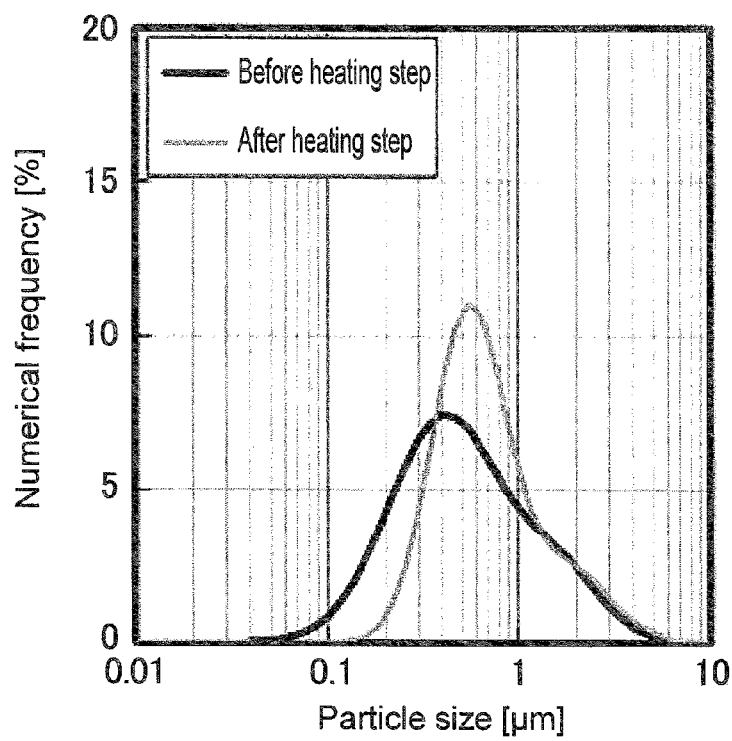
FIG. 5 is a diagram illustrating a comparison of one example of the variation in the particle size distribution curve of the particles that constitute the filter layer before and after a heating step.

FIG. 5 is a diagram illustrating a comparison of one example of the variation in the particle size distribution curve of the particles that constitute the filter layer before and after the heating step. The conditions of the heating step include heating at 1350° C. for 3 hours, and the particles that constitute the filter layer are alumina particles.

The particle size distribution curve before the heating step is indicated by the dark-colored line, and corresponds with the particle size distribution curve of the filter layer illustrated in FIG. 3. The particle size distribution curve after the heating step is indicated by the light-colored line, and corresponds with the particle size distribution curve of the filter layer illustrated in FIG. 4.

The average particle size before the heating step is 0.54 µm, and the average particle size after the heating step is 0.70 µm. In other words, the heating step tends to cause an increase in the particle size.

Furthermore, based on the shapes of the particle size distribution curves, it is evident that the number of particles with small diameters (particles on the left side of the curve) has reduced, with the curve shifting to the right. Further, although the number of particles with large diameters (particles on the right side of the curve) has increased, the size of the particle size has not changed after the heat treatment.

It is thought that these observations indicate that most of the particles that undergo a change in structure as a result of the heating step are particles with small diameters, which is though to be desirable for the formation of the linking sections.

Spherical ceramic particles with small particle sizes undergo Ostwald ripening (a phenomenon in which heating causes small particles to disappear and large particles to grow gradually larger), and the small particles tend to be condensed into larger particles. Because most particles with a particle size less than 0.3 µm disappear under the heating conditions of the heating step in the production method for a honeycomb filter according to the present invention, particles with a particle size less than 0.3 µm are suited to sintering. Consequently, it can be stated that it is preferable that the average particle size of the spherical ceramic particles with a small particle size is less than 0.3 µm.

Figure 6:
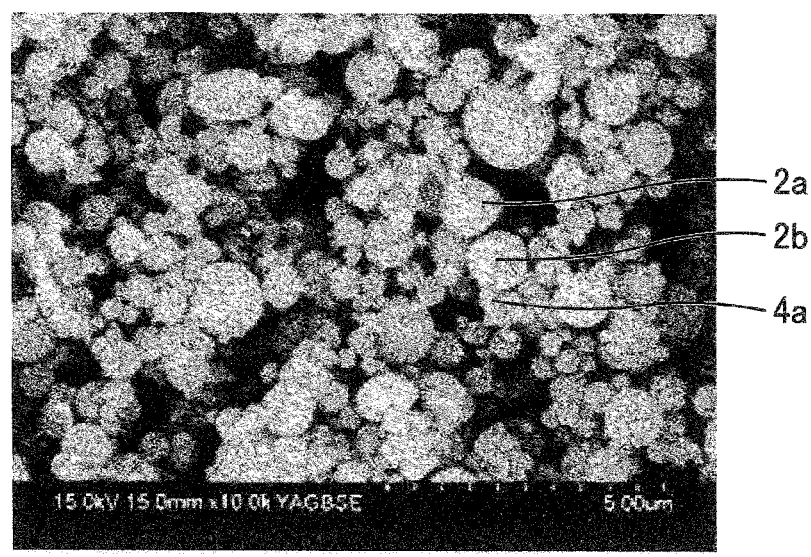
FIG. 6 is a microscope photograph, taken at an arbitrary position Y which is different from the arbitrary position X, showing the filter layer before a portion of the spherical ceramic particles are sintered.

FIG. 6 is a microscope photograph, taken at an arbitrary position Y which is different from the arbitrary position X, showing the filter layer before a portion of the spherical ceramic particles are sintered. The magnification is 10,000×.

In the filter layer shown in FIG. 6, spherical ceramic particles 2a and spherical ceramic particles 2b with relatively large particle sizes, and spherical ceramic particles 4a with relatively small particle sizes exist independently.

Figure 7:
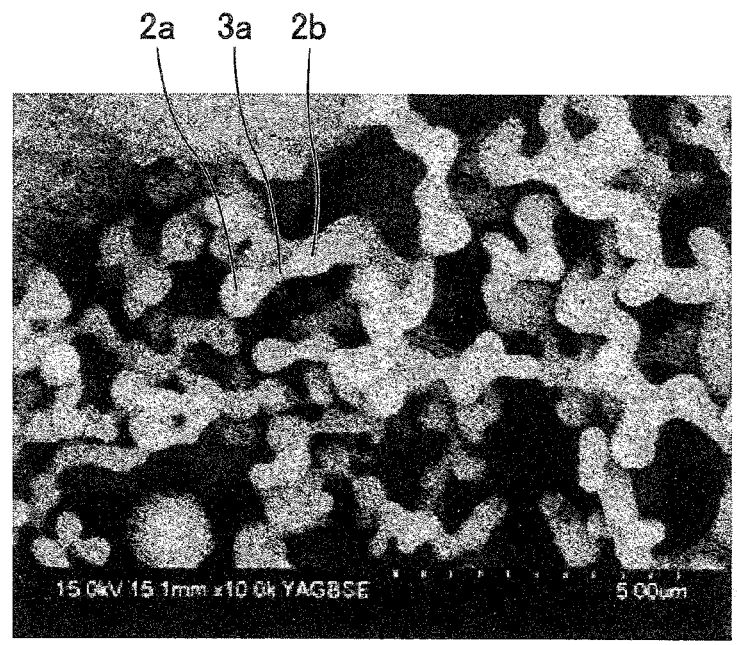
FIG. 7 is an electron microscope photograph of the filter layer taken at an arbitrary position Y.

FIG. 7 is an electron microscope photograph of the filter layer, taken at an arbitrary position Y. The magnification is 10,000×.

The filter layer shown in FIG. 7 is a photograph of the filter layer after sintering taken at an arbitrary position Y. Note that the images before and after sintering are not of the same position.

The filter layer shown in FIG. 7 is composed of a plurality of spherical ceramic particles, and crosslinking bodies which extend from one portion of the surface of an arbitrary single spherical ceramic particle among the plurality of spherical ceramic particles, and bind to an adjacent other spherical ceramic particle, and the spherical ceramic particles and the crosslinking bodies form a three-dimensional network structure In FIG. 7, the spherical ceramic particles and the crosslinking bodies are indicated as spherical ceramic particles 2a, spherical ceramic particles 2b, and crosslinking bodies 3a.

Figure 8:
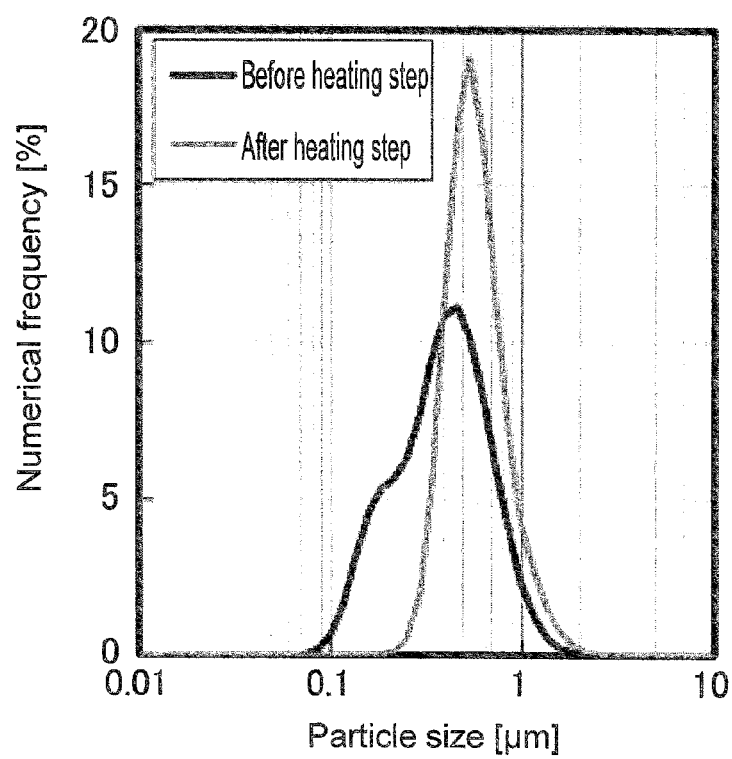
FIG. 8 is a diagram illustrating a comparison of one example of the variation in the particle size distribution curve of the particles that constitute the filter layer before and after a heating step.

FIG. 8 is a diagram illustrating a comparison of one example of the variation in the particle size distribution curve of the particles that constitute the filter layer before and after the heating step. The conditions of the heating step include heating at 1350° C. for 3 hours, and the particles that constitute the filter layer are alumina particles.

The particle size distribution curve before the heating step is indicated by the dark-colored line, and corresponds with the particle size distribution curve of the filter layer illustrated in FIG. 6. The particle size distribution curve after the heating step is indicated by the light-colored line, and corresponds with the particle size distribution curve of the filter layer illustrated in FIG. 7.

The average particle size before the heating step is 0.38 µm, and the average particle size after the heating step is 0.58 µm. In other words, the heating step tends to cause an increase in the particle size.

Spherical ceramic particles with small particle sizes undergo Ostwald ripening (a phenomenon in which heating causes small particles to disappear and large particles to grow gradually larger), and the small particles tend to be condensed into larger particles. Because most particles with a particle size less than 0.3 µm disappear under the heating conditions of the heating step in the production method for a honeycomb filter according to the present invention, particles with a particle size less than 0.3 µm are suited to sintering. Consequently, it can be stated that it is preferable that the average particle size of the spherical ceramic particles with a small particle size is less than 0.3 µm.

Figure 9:
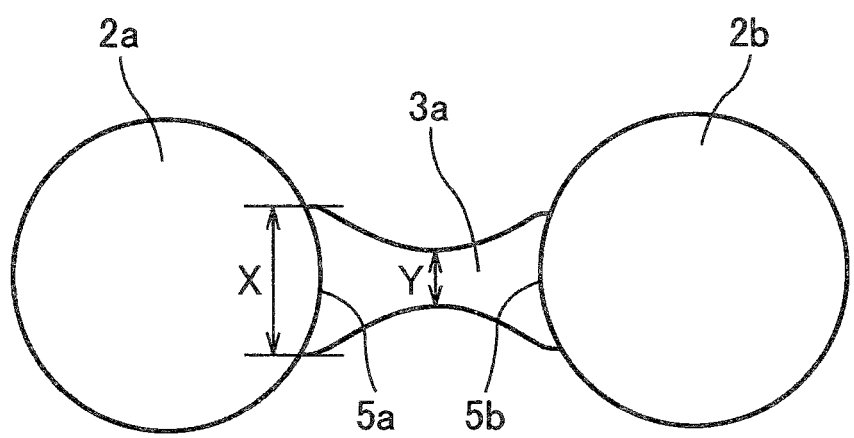
FIG. 9 is a schematic diagram illustrating the relationship between spherical ceramic particles and a crosslinking body.

FIG. 9 is a schematic diagram illustrating the relationship between the spherical ceramic particles and the crosslinking bodies.

FIG. 9 schematically illustrates a spherical ceramic particle 2a, a crosslinking body 3a, and a spherical ceramic particle 2b.

In FIG. 9, a boundary line 5a between the spherical ceramic particle 2a and the crosslinking body 3a, and a boundary line 5b between the spherical ceramic particle 2b and the crosslinking body 3a are also shown.

The boundary line 5a and the boundary line 5b are lines that cannot be observed in the microscope photograph shown in FIG. 7, and in reality, discontinuous portions do not actually exist at these lines.

The boundary line 5a is drawn on the assumption that the spherical ceramic particle 2a is a sphere (a circle in the figure), and is the line drawn by plotting a plurality of points (approximately 10 points) on the contour of the spherical ceramic particle 2a in the photograph as shown in FIG. 7 on the side distant from the crosslinking body 3a, and then drawing a circle that includes those plotted points.

In the filter layer of the present embodiment, the distinction between spherical ceramic particles and crosslinking bodies can be made on the basis of boundary lines defined in this manner. The boundary line 5b is a line drawn in the same manner as the boundary line 5a.

The shape of the crosslinking body 3a illustrated in FIG. 9 is a rod-shaped body, and the positions of the end portions of the rod-shaped body coincide with the boundary line 5a and the boundary line 5b respectively. In other words, the crosslinking body binds to the spherical ceramic particles at both end portions of the rod-shaped body.

Furthermore, the rod-shaped body of the crosslinking body has a shape that is narrower in the central portion than at both end portions.

Whether or not the central portion has a narrower shape can be determined by comparing the dimension of the end portions of the crosslinking body, represented by the length indicated by the double headed arrow X in FIG. 9, with the dimension of the central portion of the crosslinking body, represented by the length indicated by the double headed arrow Y in FIG. 9, and if X>Y, then the central portion of the cross-linking body can be said to have a narrower shape.

The term "rod-shaped body" is used to illustrate the fact that the shape differs from the shape of the spherical ceramic particles, and does not mean that the crosslinking body is a perfectly straight rod. The length of the crosslinking body is preferably at least twice the dimension of the central portion of the crosslinking body.

Up until this point, the filter layer of the honeycomb filter of the present embodiment has been described as a "filter layer composed of a plurality of spherical ceramic particles, and crosslinking bodies which bind the spherical ceramic particles to each other by crosslinking the spherical ceramic particles, wherein the spherical ceramic particles and the crosslinking bodies form a three-dimensional network structure (hereinafter also referred to as a particle binding type filter layer)", such as that illustrated in FIG. 4, and as a "filter layer composed of a plurality of spherical ceramic particles, and crosslinking bodies which extend from one portion of the surface of an arbitrary single spherical ceramic particle among the plurality of spherical ceramic particles, and bind to an adjacent other spherical ceramic particle, wherein the spherical ceramic particles and the crosslinking bodies form a three-dimensional network structure (hereinafter also referred to as a particle extension type filter layer)", such as that illustrated in FIG. 7.

The honeycomb filter of the present embodiment may comprise, as the filter layer, only a particle binding type filter layer, only a particle extension type filter layer, or both a particle binding type filter layer and a particle extension type filter layer.

There are no particular restrictions on the positions where the two types of filter layer form and the proportion of each type, and regardless of which type of filter layer is formed, a honeycomb filter is obtained which can achieve the effects of the present invention of high PM collection efficiency and low pressure loss.

In the honeycomb filter according to the first embodiment of the present invention, the average particle size of the particles that form the filter layer is preferably 0.2 to 1.2 µm, more preferably 0.2 to 0.9 µm, and still more preferably 0.5 to 0.8 µm.

The average particle size of the particles that constitute the filter layer mentioned here does not distinguish between the spherical ceramic particles and the crosslinking bodies, and is the average particle size obtained by measuring the particle size distribution of the filter layer.

If the average particle size of the particles that constitute the filter layer is less than 0.2 µm, then the particles that constitute the filter layer may sometimes infiltrate into the interior (fine pores) of the cell walls and block the fine pores, causing pressure loss to increase. On the other hand, if the average particle size of the particles that constitute the filter layer exceeds 1.2 µm, then the particles that constitute the filter layer are too large and the pore size of the filter layer is too large, even when the filter layer is formed. Consequently, PM passes through the filter layer and infiltrates the fine pores in the cell walls, causing a "depth filtration" state in which PM is trapped inside the cell walls, which increases pressure loss.

The average particle size of the particles that constitute the filter layer can be measured by the following method.

A honeycomb calcined body which constitutes the honeycomb filter is processed to prepare a sample with dimensions of 10 mm×10 mm×10 mm.

A single arbitrary position on the surface of the prepared sample is then observed using a scanning electron microscope (SEM). At this time, the conditions are set so that the particles that constitute the filter layer appear within a single field of view. Here, as SEM, model FE-SEM S-4800 manufactured by Hitachi, Ltd. can be used. Further, the imaging conditions for the SEM include an accelerating voltage of 15.00 kV, a working distance (WD) of 15:00 mm, and a magnification of 10,000×.

Next, the particle size of every particle within the single field of view is measured visually. The average value of the particle sizes of all the particles measured in the single field of view is deemed the average particle size.

In the honeycomb filter according to the first embodiment of the present invention, the spherical ceramic particles which constitute the filter layer preferably include heat-resistant oxide ceramic particles.

Examples of the heat-resistant oxide ceramic particles include alumina, silica, mullite, ceria, zirconia, cordierite, zeolite, and titania. These may be used individually, or a combination of two or more of them may be used.

Of the above heat-resistant oxide ceramic particles, alumina is preferred.

In the honeycomb filter according to the first embodiment of the present invention, the filter layer is formed only on the surface of the cell walls of those cells in which the end section at the fluid inlet side is open and the end section at the fluid outlet side is sealed.

Because the exhaust gas is introduced into the cells from the fluid inlet side of the honeycomb filter, the PM in the exhaust gas is deposited in large amounts on the cell walls of those cells in which the end section at the fluid inlet side is open and the end section at the fluid outlet side is sealed. Accordingly, if the filter layer is formed only on the surface of the cell walls of those cells in which the end section at the fluid inlet side is open and the end section at the fluid outlet side is sealed, then depth filtration of the PM deposited on these cell walls can be efficiently prevented.

Moreover, in the honeycomb filter according to the first embodiment of the present invention, the filter layer is preferably formed across the entire surface of the cell walls of those cells in which the end section at the fluid inlet side is open and the end section at the fluid outlet side is sealed, but there may be some portions of the surface of these cell walls where the filter layer is not formed.

In the honeycomb filter according to the first embodiment of the present invention, examples of the shapes of cross sections perpendicular to the longitudinal direction of the large volume cells and the small volume cells within the honeycomb calcined bodies include the shapes described below.

FIG. 10(a), FIG. 10(b) and FIG. 10(c) are side views schematically illustrating examples of the cell structure of a honeycomb calcined body that constitutes the honeycomb filter according to the first embodiment of the present invention.

In FIG. 10(a), FIG. 10(b) and FIG. 10(c), the filter layer is not shown.

In a honeycomb calcined body 120 illustrated in FIG. 10(a), the shape of large volume cells 121a in a cross section perpendicular to the longitudinal direction is substantially octagonal, the shape of small volume cells 121b in a cross section perpendicular to the longitudinal direction is substantially tetragonal, and the large volume cells 121a and the small volume cells 121b are arranged in an alternating pattern. Similarly, in a honeycomb calcined body 130 illustrated in FIG. 10(b), the shape of large volume cells 131a in a cross section perpendicular to the longitudinal direction is substantially octagonal, the shape of small volume cells 131b in a cross section perpendicular to the longitudinal direction is substantially tetragonal, and the large volume cells 131a and the small volume cells 131b are arranged in an alternating pattern. The honeycomb calcined body 120 illustrated in FIG. 10(a) and the honeycomb calcined body 130 illustrated in FIG. 10(b) have different area ratios between the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell).

Furthermore, in a honeycomb calcined body 140 illustrated in FIG. 10(c), the shape of large volume cells 141a in a cross section perpendicular to the longitudinal direction is substantially tetragonal, the shape of small volume cells 141b in a cross section perpendicular to the longitudinal direction is substantially tetragonal, and the large volume cells 141a and the small volume cells 141b are arranged in an alternating pattern.

In the honeycomb filter according to the first embodiment of the present invention, the area ratio of the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell) is preferably within a range from 1.4 to 2.8, and more preferably from 1.5 to 2.4.

By using the large volume cells as the fluid inlet side cells and the small volume cells as the fluid outlet side cells, a large amount of PM can be deposited on the fluid inlet side cells (large volume cells), but if the aforementioned area ratio is less than 1.4, then because the difference between the cross sectional area of the large volume cells and the cross sectional area of the small volume cells is small, the effects obtained by providing large volume cells and small volume cells are not so significant. On the other hand, if the area ratio exceeds 2.8, then the area of the cross section perpendicular to the longitudinal direction of the small volume cells becomes too small, and the friction generated when a gas such as an exhaust gas passes through the fluid outlet side cells (small volume cells) causes an increase in the pressure loss.

Next, a production method for a honeycomb filter according to the first embodiment of the present invention is described.

A production method for a honeycomb filter according to a first embodiment of the present invention is a production method for a honeycomb filter comprising:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, in which the filter layer is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure, the production method comprising:

a honeycomb calcined body production step of producing, from ceramic powders, a porous honeycomb calcined body in which a multitude of cells are disposed in parallel in a longitudinal direction and are separated by cell walls, each cell being sealed at an end section at either the fluid inlet side or the fluid outlet side, a droplet dispersion step of dispersing droplets containing a raw material of the spherical ceramic particles in a carrier gas, a drying step of drying the carrier gas at 100 to 800° C., thereby forming spherical ceramic particles from the droplets containing the raw material of the spherical ceramic particles, an inflow step of introducing the carrier gas into those cells in which the end section at the fluid inlet side is open and the end section at the fluid outlet side is sealed, and depositing the spherical ceramic particles on the surface of the cell walls, and a heating step of heating the ceramic honeycomb substrate to 1100 to 1500° C.

In the production method for the honeycomb filter according to the first embodiment of the present invention, a ceramic honeycomb substrate containing honeycomb calcined bodies is prepared, and a filter layer is formed on the surface of the cell walls of the ceramic honeycomb substrate.

Prior to describing the other steps, the procedure for the steps for forming the filter layer is described below.

In the present embodiment, the filter layer is formed on the surface of the cell walls of the ceramic honeycomb substrate by performing the droplet dispersion step, the drying step, the carrier gas inflow step, and the ceramic honeycomb substrate heating step.

Furthermore, in the description of the present embodiment, the case in which the material that constitutes the filter layer is a heat-resistant oxide is described as an example.

The step of preparing the ceramic honeycomb substrate containing the honeycomb calcined bodies will be described later in the specification.

Figure 11:
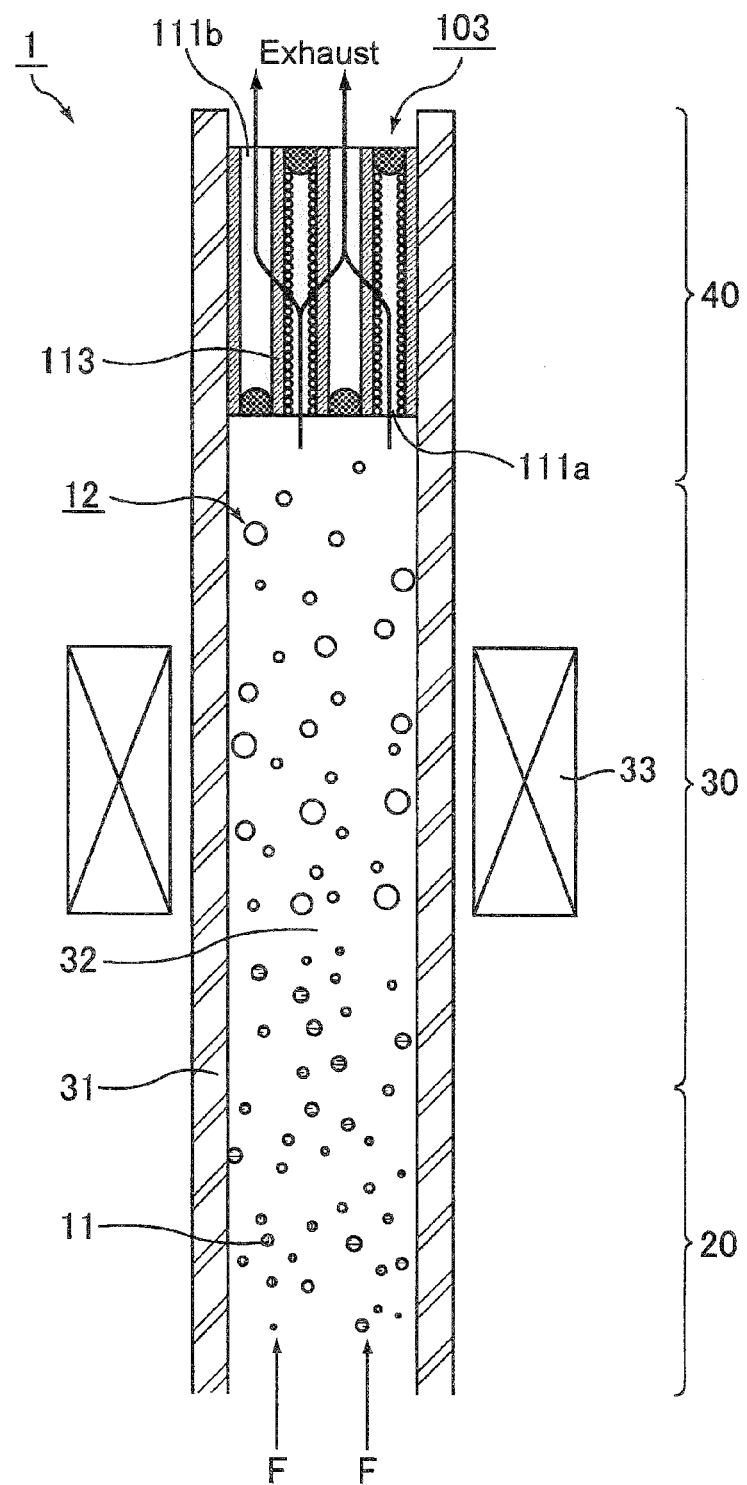
FIG. 11 is a cross-sectional view schematically illustrating an embodiment of a droplet dispersion step and a carrier gas inflow step.

FIG. 11 is a cross-sectional view schematically illustrating an embodiment of the droplet dispersion step and the carrier gas inflow step.

FIG. 11 shows a carrier gas inflow device 1, which is a device that introduces the carrier gas into the cells of the ceramic honeycomb substrate.

The carrier gas inflow device 1 comprises a droplet dispersion section 20 which disperses droplets within the carrier gas, a pipe section 30 through which the carrier gas containing the dispersed droplets travels, and an inflow section 40 which introduces the carrier gas into the cells of the ceramic honeycomb substrate.

An example of using the carrier gas inflow device 1 to perform the droplet dispersion step and the carrier gas inflow step is described below.

In the carrier gas inflow device 1, a carrier gas F flows from the bottom of FIG. 11 toward the top. In the carrier gas inflow device 1, the carrier gas F is introduced from the bottom of the carrier gas inflow device 1, passes through the droplet dispersion section 20, the pipe section 30 and the inflow section 40, and is discharged from the top of the inflow section 40.

The carrier gas F is pressurized from the bottom to the top in FIG. 11, by a pressure difference produced by either a pressure applied from below the carrier gas inflow device or a suction applied from above the carrier gas inflow device, causing the carrier gas F to flow upward through the inside of the carrier gas inflow device 1.

A gas which does not react upon heating up to 800° C. and does not react with the components in the droplets dispersed within the carrier gas is used as the carrier gas.

Examples of the carrier gas include gases such as air, nitrogen, and argon.

In the droplet dispersion section 20 of the carrier gas inflow device 1, an oxide-containing solution stored in a tank not shown in the figure is converted to droplets 11 by spraying, and dispersed within the carrier gas F.

The expression "oxide-containing solution" is a concept which includes a solution containing a heat-resistant oxide precursor which forms a heat-resistant oxide upon heating, or a slurry containing heat-resistant oxide particles.

A heat-resistant oxide precursor means a compound which is converted to a heat-resistant oxide by heating.

Examples include a hydroxide, carbonate, nitrate or hydrate of the metal that constitutes the heat-resistant oxide.

Examples of the heat-resistant oxide precursor when the heat-resistant oxide is alumina, that is an alumina precursor, include aluminum nitrate, aluminum hydroxide, boehmite, and diaspore.

Furthermore, the slurry containing heat-resistant oxide particles is a solution of heat-resistant oxide particles suspended in water.

The droplets 11 dispersed in the carrier gas F flow upward through the carrier gas inflow device 1, carried by the flow of the carrier gas F, and pass through the pipe section 30.

The pipe section 30 of the carrier gas inflow device 1 is a pipe through which the carrier gas F containing the dispersed droplets 11 passes.

A channel 32 of the pipe section 30 through which the carrier gas F passes is a space enclosed by a pipe wall 31 of the pipe.

In the carrier gas inflow device 1 used in the present embodiment, a heating mechanism 33 is provided on the pipe section 30.

An example of the heating mechanism 33 is an electric heater or the like.

In the present embodiment, the pipe wall 31 of the pipe is heated using the heating mechanism 33, and the carrier gas F containing the dispersed droplets 11 is passed through the pipe section 30. Accordingly, the carrier gas F that passes through the pipe section 30 is heated, thereby heating the droplets 11 dispersed within the carrier gas F, When the droplets 11 are heated, the liquid component contained in the droplets evaporates, forming spherical ceramic particles 12. In FIG. 11, the spherical ceramic particles 12 are depicted as white circles.

When the droplets contain a heat-resistant oxide precursor, heating the carrier gas causes the heat-resistant oxide precursor to become a heat-resistant oxide (spherical ceramic particles).

In the present embodiment, it is preferable that the pipe wall 31 of the pipe is heated to 100 to 800° C. using the heating mechanism 33, and that the carrier gas F containing the dispersed droplets 11 passes through the pipe in 0.1 to 3.0 seconds.

If the temperature of the heated pipe is less than 100° C., and the time taken for the carrier gas to pass through the pipe is less than 0.1 second, then the water in the droplets may not be able to be evaporated adequately.

On the other hand, if the temperature of the heated pipe exceeds 800° C., and the time taken for the carrier gas to pass through the pipe exceeds 3.0 seconds, then the amount of energy required to produce the honeycomb filter becomes too large, reducing the production efficiency of the honeycomb filter.

In the present embodiment, there are no particular restrictions on the length of the pipe, but the length is preferably from 500 to 3,000 mm.

If the length of the pipe is less than 500 mm, then the water in the droplets cannot be adequately evaporated even if the carrier gas is passed through the pipe slowly. On the other hand, if the length of the pipe exceeds 3,000 mm, then the device used to produce the honeycomb filter becomes too large, reducing the production efficiency of the honeycomb filter.

The spherical ceramic particles 12 remain dispersed within the carrier gas F, flow upward through the carrier gas inflow device 1 carried by the flow of the carrier gas F, and flow into the cells of the ceramic honeycomb substrate 103 in the inflow section 40.

In the present embodiment, a ceramic block formed by bundling a plurality of honeycomb calcined bodies together via adhesive material layers is used as the ceramic honeycomb substrate.

The ceramic honeycomb substrate 103 is disposed at the top of the carrier gas inflow device 1 so as to plug the outlet of the carrier gas inflow device 1.

As a result, the carrier gas F must necessarily flow into the interior of the ceramic honeycomb substrate 103.

In FIG. 11, a cross section of the honeycomb calcined body that constitutes the ceramic block (a similar cross section to that illustrated in FIG. 2(b)) is shown schematically as the cross section of the ceramic honeycomb substrate 103.

In the ceramic honeycomb substrate 103, the end sections of the fluid inlet side cells 111a are open, and the fluid outlet side cells 111b are sealed.

As a result, the carrier gas F flows into the ceramic honeycomb substrate 103 through the openings of the fluid inlet side cells 111a.

When the carrier gas F containing the dispersed spherical ceramic particles 12 flows into the fluid inlet side cells 111a of the ceramic honeycomb substrate 103, the spherical ceramic particles 12 accumulate on the surfaces of the cell walls 113 of the ceramic honeycomb substrate 103.

Further, in the present embodiment, the ceramic honeycomb substrate 103 is preferably heated to 100 to 800° C., so that the carrier gas F is introduced into heated cells.

When the ceramic honeycomb substrate 103 is heated to 100 to 800° C., then even if any liquid components remain in the spherical ceramic particles 12, these liquid components evaporate, so that the spherical ceramic particles are deposited on the surface of the cell walls in a dried powder state.

The carrier gas F is introduced into the interior of the ceramic honeycomb substrate 103 through the openings of the fluid inlet side cells 111a, passes through the cell walls 113 of the ceramic honeycomb substrate 103, and flows out through the openings of the fluid outlet side cells 111b.

The carrier gas inflow step is performed using this type of procedure.

Subsequently, the ceramic honeycomb substrate heating step is performed.

The ceramic honeycomb substrate having the spherical ceramic particles adhered to the cell walls as a result of the carrier gas inflow step is heated at a furnace temperature of 1100 to 1500° C. using a heating furnace.

An open air atmosphere, nitrogen atmosphere or argon atmosphere is preferable as the heating atmosphere.

As described previously, this heating step causes a portion of the spherical ceramic particles to undergo sintering, thus forming crosslinking bodies which bind the spherical ceramic particles to each other. Further, crosslinking bodies that extend from a portion of the spherical ceramic particles may also be formed, thus forming crosslinking bodies that are bound to spherical ceramic particles.

In other words, as a result of the heating step, a filter layer having a three-dimensional network structure is formed.

Moreover, as a result of the heating, the spherical ceramic particles adhered to the surfaces of the cell walls undergo thermal contraction, which anchors the particles strongly to the surfaces of the cell walls.

In the production method for the honeycomb filter according to the first embodiment of the present invention the steps for preparing the ceramic honeycomb substrate containing the honeycomb calcined bodies are described below.

The ceramic honeycomb substrate prepared by the following steps is a ceramic block formed by bundling a plurality of honeycomb calcined bodies together via adhesive material layers.

In the following explanation, silicon carbide is used as an example of the ceramic powder.

(1) A molding step is performed in which a honeycomb molded body is prepared by extrusion molding of a wet mixture containing the ceramic powder and a binder.

Specifically, first, a wet mixture for producing the honeycomb molded body is prepared by mixing silicon carbide powders with different average particle sizes as the ceramic powder, an organic binder, a liquid plasticizer, a lubricant, and water.

Next, the wet mixture is fed into an extrusion molding machine and extrusion molded to prepare a honeycomb molded body with a predetermined shape.

Here, the honeycomb molded body is prepared using a mold that produces a cross-sectional shape having the cell structure (cell shape and cell arrangement) illustrated in FIG. 2(a) and FIG. 2(b).

(2) The honeycomb molded body is cut to a predetermined length and dried using a microwave dryer, hot air dryer, dielectric dryer, reduced pressure dryer, vacuum dryer, or freeze dryer or the like, and a sealing step is then performed in which predetermined cells are packed with a sealing material paste that becomes the sealing material, thereby sealing those cells.

Here, the wet mixture described above can be used as the sealing material paste.

(3) After performing a degreasing step in which the honeycomb molded body is heated in a degreasing furnace to remove the organic matter within the honeycomb molded body, the degreased honeycomb molded body is transported into a calcining furnace and subjected to a calcination step, thereby preparing a honeycomb calcined body of the type illustrated in FIG. 2(a) and FIG. 2(b).

The sealing material paste packed at the end sections of the cells is calcined by the heating and forms the sealing material.

Furthermore, the conditions for the cutting step, the drying step, the sealing step, the degreasing step and the calcination step can employ the types of conditions conventionally used to prepare honeycomb calcined bodies.

(4) A bundling step is performed in which a plurality of honeycomb calcined bodies are sequentially laminated together via an adhesive material paste upon a support stage, thereby preparing a honeycomb aggregated body having a plurality of stacked honeycomb calcined bodies.

For the adhesive material paste, for example, a paste comprising an inorganic binder, an organic binder and inorganic particles is used. Further, the adhesive material paste may also contain inorganic fibers and/or whiskers.

(5) By heating the honeycomb aggregated body, the adhesive material paste is thermally hardened and forms an adhesive material layer, thus preparing a quadrangular prism-shaped ceramic block.

The thermal hardening conditions for the adhesive material paste may be the types of conditions conventionally used when preparing honeycomb filters.

(6) A cutting step is performed in which the ceramic block is cut.

Specifically, by cutting the outer periphery of the ceramic block using a diamond cutter, a ceramic block is prepared with an outer periphery that has been processed to a substantially circular cylindrical shape.

(7) An outer periphery coating layer formation step is performed in which an outer periphery coating material paste is applied to the outer peripheral surface of the substantially circular cylindrical ceramic block, and then dried and solidified to form an outer periphery coating layer.

Here, the adhesive material paste mentioned above can be used as the outer periphery coating material paste. A paste with a different composition from the above adhesive material paste may also be used as the outer periphery coating material paste.

The outer periphery coating layer need not necessarily be provided, and may be provided as required.

By providing the outer periphery coating layer, the shape of the outer periphery of the ceramic block can be neatened, enabling a ceramic honeycomb substrate with a circular cylindrical shape to be obtained.

By performing the above steps, a ceramic honeycomb substrate containing honeycomb calcined bodies can be prepared.

By subsequently subjecting the ceramic honeycomb substrate to the aforementioned droplet dispersion step, carrier gas inflow step, and ceramic honeycomb substrate heating step, the filter layer can be formed on the surface of the cell walls of the ceramic honeycomb substrate, thus preparing a honeycomb filter.

Examples of the functions and effects of the honeycomb filter according to the first embodiment of the present invention and the production method for the honeycomb filter are described below.

(1) In the honeycomb filter of the present embodiment, the filter layer is formed on the surface of the cell walls of those cells in which the end section at the fluid inlet side is open and the end section at the fluid outlet side is sealed. Consequently, deep filtration of PM can be efficiently prevented.

(2) In the honeycomb filter of the present embodiment, the spherical ceramic particles and the crosslinking bodies form a three-dimensional network structure.

A three-dimensional network structure is well suited to trapping PM, and the gas components in the exhaust gas can pass through the three-dimensional network structure. As a result, a honeycomb filter with this type of filter layer becomes a honeycomb filter with high collection efficiency and low pressure loss.

Further, because the spherical ceramic particles are bound to each other via the crosslinking bodies, a robust filter layer can be obtained in which the particles are unlikely to become detached.

Furthermore, because the spherical ceramic particles are bound to other spherical ceramic particles by a plurality of crosslinking bodies, thermal stress applied to the spherical ceramic particles is dispersed across the plurality of crosslinking bodies, so that detachment of the filter layer becomes unlikely.

(3) In the honeycomb filter of the present embodiment, the crosslinking bodies are rod-shaped bodies which exist between the spherical ceramic particles and have a shape that is narrower in the central portion than at both end portions that bind to the spherical ceramic particles.

When the crosslinking bodies are rod-shaped bodies having a shape that is narrower in the central portion, the spherical ceramic particles and the crosslinking bodies are bound strongly by surface contact, so that a more robust filter layer can be obtained in which particles are even less likely to become detached.

Further, the fact that the crosslinking bodies are rod-shaped bodies having a shape that is narrower in the central portion means that the crosslinking bodies have formed a neck as a result of sintering. Because the bonds produced by sintering have a powerful binding force, a robust filter layer can be obtained.

(4) In the honeycomb filter of the present embodiment, the crosslinking bodies are formed by the sintering of spherical ceramic particles with a relatively small particle size compared with the average particle size of the spherical ceramic particles, and the average particle size of these spherical ceramic particles with a relatively small particle size is less than 0.3 µm.

The spherical ceramic particles with a small particle size undergo Ostwald ripening (a phenomenon in which heating causes small particles to disappear and large particles to grow gradually larger), and the small particles are condensed into larger particles. As a result, the small particles become the crosslinking bodies that crosslink the large particles together, yielding a robust laminated body. In other words, a robust filter layer is formed. In particular, small spherical ceramic particles with an average particle size of less than 0.3 µm tend to condense easily under the heat treatment conditions used in the production method for a honeycomb filter according to the present invention, and are therefore particularly suited to the formation of a robust filter layer.

(5) In the honeycomb filter of the present embodiment, the spherical ceramic particles are heat-resistant oxide ceramic particles, and the heat-resistant oxide ceramic particles are at least one type selected from the group consisting of alumina, silica, mullite, ceria, zirconia, cordierite, zeolite, and titania.

When the filter layer is formed from heat-resistant oxide ceramic particles, even if a regeneration treatment is performed to incinerate the PM, problems such as melting of the filter layer do not occur. As a result, a honeycomb filter having excellent heat resistance can be obtained.

(6) In the honeycomb filter of the present embodiment, pores are formed as a result of the spherical ceramic particles and the crosslinking bodies forming a three-dimensional network structure, and the average pore size of the pores is larger than the average particle size of the spherical ceramic particles.

The fact that the average pore size of the pores formed as a result of the formation of the three-dimensional network structure is larger than the average particle size of the spherical ceramic particles indicates that the pores provided in the filter layer are sufficiently large that the gas components of the exhaust gas can pass through the filter layer.

In other words, a honeycomb filter is obtained in which the increase in pressure loss due to the provision of the filter layer is small.

(7) In the production method for a honeycomb filter of the present embodiment, droplets containing the raw material of the spherical ceramic particles are dispersed in a carrier gas, and the carrier gas is dried at 100 to 800° C. By drying the carrier gas, the moisture component within the droplets dispersed in the carrier gas can be removed to form the spherical ceramic particles. Further, when the raw material of the spherical ceramic particles contained in the carrier gas is a precursor to a heat-resistant oxide, the precursor to the heat-resistant oxide can be converted to spherical ceramic particles in the drying step.

The thus produced spherical ceramic particles are introduced into the cells, the spherical ceramic particles are deposited on the cell walls, and then the heating step of heating the ceramic honeycomb substrate to 1100 to 1500° C. is performed. Some of the spherical ceramic particles undergo sintering in the heating step, and become crosslinking bodies that bind spherical ceramic particles to each other by crosslinking the spherical ceramic particles, so that a filter layer with a three-dimensional network structure can be obtained.

(8) In the production method for a honeycomb filter of the present embodiment, in the droplet dispersion step, the droplets are dispersed in the carrier gas by spraying.

By using spraying to disperse the droplets, spherical droplets can be produced. Because the particles obtained from spherical droplets are also spherical, dispersion by spraying is well suited to producing spherical ceramic particles.

(9) In the production method for a honeycomb filter of the present embodiment, the droplets may include, as a raw material of the spherical ceramic particles, a heat-resistant oxide precursor that becomes a heat-resistant oxide upon heating.

When a heat-resistant oxide precursor is included in the droplets, a heat-resistant oxide can be obtained by heating the carrier gas, and by introducing the heat-resistant oxide into the cells, a filter layer can be formed which is composed of particles containing a heat-resistant oxide as the spherical ceramic particles.

(10) In the production method for a honeycomb filter of the present embodiment, the droplets include a heat-resistant oxide as a raw material of the spherical ceramic particles.

When the droplets include a heat-resistant oxide, particles containing the heat-resistant oxide can be obtained by heating the carrier gas to remove the moisture component in the droplets, and by introducing the particles containing the heat-resistant oxide into the cells, a filter layer can be formed which is composed of particles containing the heat-resistant oxide as the spherical ceramic particles.

EXAMPLES

The honeycomb filter of the first embodiment of the present invention and the production method for the honeycomb filter are described below in more detail using specific examples. However, the present invention is not limited solely to these examples.

Example 1

Preparation of Ceramic Honeycomb Substrate

First, a molding step was performed by mixing 54.6% by weight of a coarse powder of silicon carbide with an average particle size of 22 μm and 23.4% by weight of a fine powder of silicon carbide with an average particle size of 0.5 μm, to which 4.3% by weight of an organic binder (methyl cellulose), 2.6% by weight of a lubricant (Unilube manufactured by NOF Corporation), 1.2% by weight of glycerol and 13.9% by weight of water were added and kneaded to obtain a wet mixture, which was then extrusion-molded.

In this step, crude honeycomb molded bodies having the same shape as the honeycomb calcined body 110 illustrated in FIG. 2(a) but with no sealing of the cells were prepared.

Next, dried honeycomb molded bodies were prepared by drying the crude honeycomb molded bodies using a microwave dryer. Subsequently, a sealing material paste was packed into predetermined cells of the dried honeycomb molded bodies, thereby sealing the cells. A part of the wet mixture described above was used as the sealing material paste. After sealing the cells, the dried honeycomb molded bodies packed with the sealing material paste were dried again using a dryer.

Subsequently, the dried honeycomb molded bodies with sealed cells were subjected to a degreasing treatment at 400° C. to degrease the dried honeycomb molded bodies, and were then subjected to a calcination treatment in a normal pressure argon atmosphere at 2200° C. for 3 hours.

As a result, quadrangular prism-shaped honeycomb calcined bodies were obtained.

An adhesive material paste was applied on the honeycomb calcined bodies obtained by the above steps, thus forming adhesive material paste layers, and by thermally hardening the adhesive material paste layers to fault adhesive material layers, a substantially prism-shaped ceramic block composed of 16 honeycomb calcined bodies bundled together via the adhesive material layers was prepared.

For the adhesive material paste, an adhesive material paste containing 30% by weight of alumina fibers with an average fiber length of 20 μm, 21% by weight of silicon carbide particles with an average particle size of 0.6 μm, 15% by weight of a silica sol, 5.6% by weight of carboxymethyl cellulose, and 28.4% by weight of water was used.

Subsequently, a circular cylindrical ceramic block with a diameter of 142 mm was prepared by using a diamond cutter to cut the outer periphery of the prism-shaped ceramic block.

Next, an outer periphery coating material paste was applied to the outer peripheral surface of the circular cylindrical ceramic block, and the outer periphery coating material paste was thermally hardened at 120° C. to form an outer periphery coating layer on the outer peripheral portion of the ceramic block.

The same paste as the adhesive material paste described above was used as the outer periphery coating material paste.

As a result of the above steps, a circular cylindrical ceramic honeycomb substrate with a diameter of 143.8 mm and a length of 150 mm was prepared.

(Droplet Dispersion Step and Filter Layer Formation Step)

A filter layer was formed on the ceramic honeycomb substrate using the carrier gas inflow device illustrated in FIG. 11.

The ceramic honeycomb substrate was placed at the top of the carrier gas inflow device as illustrated in FIG. 11.

At this time, the ceramic honeycomb substrate was positioned so that the openings of the large volume cells faced toward the bottom of the carrier gas inflow device as the fluid inlet side cells.

A solution containing boehmite, which is a heat-resistant oxide precursor, was prepared as an oxide-containing solution. The boehmite concentration was 3.8 mol/l.

Droplets containing boehmite were then dispersed in the carrier gas by spraying.

The pipe wall of the pipe of the carrier gas inflow device was heated to a temperature of 200° C., and the carrier gas was introduced so as to flow toward the top of the carrier gas inflow device (the ceramic honeycomb substrate side) at a flow rate of 15.8 mm/sec, thereby evaporating the moisture within the droplets dispersed in the carrier gas. As a result of the evaporation of the moisture in the droplets that occurred as the carrier gas passed through the pipe, the droplets were converted to spherical alumina particles.

The length of the pipe was 1200 mm.

The carrier gas containing the dispersed spherical alumina particles was introduced into the cells of the ceramic honeycomb substrate, and the spherical alumina particles were adhered to the surfaces of the cell walls.

Subsequently, the ceramic honeycomb substrate was removed from the carrier gas inflow device, and heated in a calcining furnace at 1350° C. for 3 hours in an open air atmosphere.

As a result of the above steps, a honeycomb filter was produced which had a filter layer composed of alumina particles formed on the surfaces of the cell walls.

Photographs of the filter layer of the honeycomb filter obtained by the above steps are shown in FIG. 4 and FIG. 7, which show a filter layer having a three-dimensional network structure.

(Observation of State of Detachment of Filter Layer)

The state of detachment of the filter layer was observed using the following procedure.

First, the honeycomb filter was dried in a dryer at 150° C. for 1 hour. Then, the honeycomb filter was immersed in water from the end section at the fluid outlet side, and subjected to ultrasonic cleaning (43 kHz) in the water for 30 minutes. Subsequently, water was introduced into the honeycomb filter from the end section at the fluid outlet side, and the water was passed through the cell walls and discharged from the end section at the fluid inlet side.

After draining the water, the honeycomb filter was placed in a dryer and dried at 150° C. for 2 hours.

Then, the honeycomb filter was observed using an electron microscope to ascertain whether detachment of the filter layer had occurred.

Observation of the state of detachment of the filter layer for the honeycomb filter produced in Example 1 confirmed that no detachment had occurred, and that a robust filter layer had been formed.

Comparative Example 1

A honeycomb filter was prepared in the same manner as Example 1, with the exception that after the alumina particles were adhered to the surfaces of the cell walls, the heating step that was performed in a calcining furnace at 1350° C. in Example 1 was not performed.

Photographs of the filter layer of the honeycomb filter obtained in Comparative Example 1 are shown in FIG. 3 and FIG. 6, and in these photographs, neither crosslinking bodies nor a three-dimensional network structure was observed.

When an observation was made as to whether detachment of the filter layer would occur in this honeycomb filter upon performing the method described above, it was found that detachment had occurred. Thus, it was confirmed that a filter layer lacking crosslinking sections and a three-dimensional network structure is prone to detachment.

Comparative Example 2

In Example 1, the droplet dispersion step and the filter layer formation step were not performed, and an alumina film was coated onto the cell walls by immersing the ceramic honeycomb substrate in a slurry containing alumina particles (with an average particle size of 5 μm).

Then, the resulting product was heated in a calcining furnace at 1350° C. for 3 hours in an open air atmosphere to produce a honeycomb filter.

Figure 12:
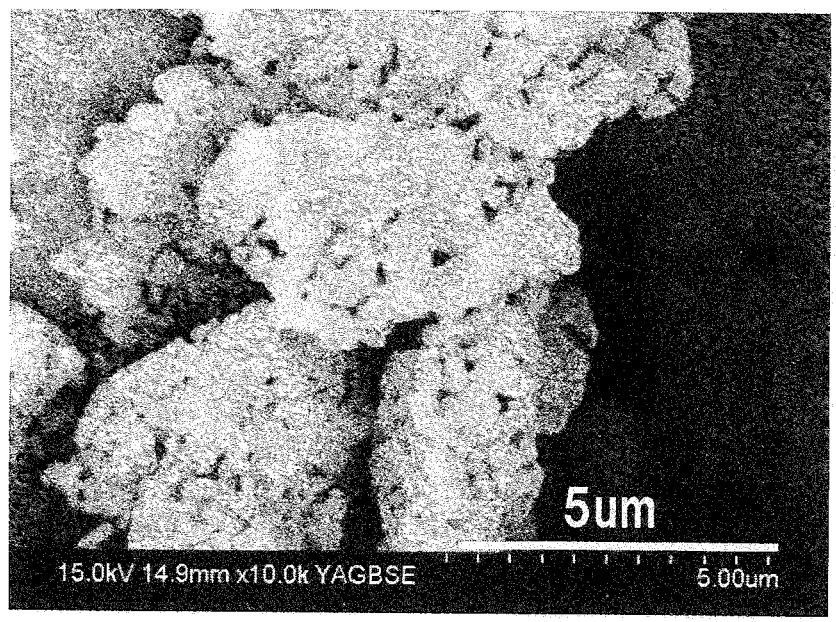
FIG. 12 is an electron microscope photograph of an alumina film of a honeycomb filter produced in Comparative Example 2.

FIG. 12 is an electron microscope photograph of the alumina film of the honeycomb filter produced in Comparative Example 2.

Based on FIG. 12, it is evident that none of the spherical ceramic particles, the crosslinking bodies, or the three-dimensional network structure exists, and that pores have not been formed in the alumina film.

Because pores have not been formed in the alumina film, gases cannot pass through the filter layer, increasing pressure loss.

(Other Embodiments)

In the honeycomb filter according to the first embodiment of the present invention, the filter layer is formed only on the surface of the cell walls of those cells in which the end section at the fluid inlet side is open and the end section at the fluid outlet side is sealed.

However, in a honeycomb filter according to another embodiment of the present invention, the filter layer may be formed not only on the surface of the cell walls of cells in which the end section at the fluid inlet side is open and the end section at the fluid outlet side is sealed, but also on the surface of the cell walls of cells in which the end section at the fluid inlet side is sealed and the end section at the fluid outlet side is open.

This type of honeycomb filter can be produced by immersing the ceramic honeycomb substrate in a slurry containing the spherical ceramic particles that has been prepared in advance, and then heating the resulting product.

In a production method for a honeycomb filter according to an embodiment of the present invention, the droplets may contain heat-resistant oxide particles as the raw material of the ceramic particles.

When the droplets contain heat-resistant oxide particles, particles of the heat-resistant oxide can be obtained by heating the carrier gas to remove the moisture within the droplets. Moreover, by introducing particles of the heat-resistant oxide into the cells, a filter layer composed of particles of the heat-resistant oxide can be formed.

Further, a filter layer composed of particles of the heat-resistant oxide can also be formed by introducing the droplets containing the heat-resistant oxide particles into the cells, and then removing the moisture within the droplets.

In a honeycomb filter according to an embodiment of the present invention, all of the cells of the honeycomb calcined bodies that constitute the honeycomb filter may have the same shape in a cross section perpendicular to the longitudinal direction, and both the cells that are sealed and the cells that are open at one end surface of the honeycomb calcined bodies may have the same area for cross sections perpendicular to the longitudinal direction of the cells.

In a honeycomb filter according to an embodiment of the present invention, the ceramic honeycomb substrate (ceramic block) may be formed from a single honeycomb calcined body.

This type of honeycomb filter formed from a single honeycomb calcined body is also called an integrated type honeycomb filter. Cordierite or aluminum titanate or the like can be used as the main constituent material of an integrated type honeycomb filter.

In a honeycomb filter according to an embodiment of the present invention, the shape of the cross section of each cell of a honeycomb calcined body in a direction perpendicular to the longitudinal direction of the honeycomb calcined body is not limited to a substantially tetragonal shape, and can be an arbitrary shape such as a substantially circular shape, substantially elliptical shape, substantially pentagonal shape, substantially hexagonal shape, substantially trapezoidal shape, or substantially octagonal shape. Further, a mixture of various shapes may also be used.

In the honeycomb filter of the present invention, the essential structural elements are that the filter layer is formed on the surface of the cell walls of the ceramic honeycomb substrate, that the filter layer is composed of a plurality of spherical ceramic particles and crosslinking bodies, and that the spherical ceramic particles and crosslinking bodies constitute a three-dimensional network structure.

By appropriate combination of these essential structural elements with the various configurations described in the first embodiment and the other embodiments (for example, the structure of the filter layer, the method for forming the filter layer, the cell structure of the honeycomb calcined bodies, and the honeycomb filter production steps and the like), the desired effects can be obtained.

DESCRIPTION OF THE REFERENCE NUMERALS

1 Carrier gas inflow device
2A, 2B, 2a, 2b, 12 Spherical ceramic particles
3A, 3a Crosslinking bodies
4A, 4a Spherical ceramic particles with relatively small particle size
11 Droplets
100 Honeycomb filter
103 Ceramic honeycomb substrate (ceramic block)
110, 120, 130, 140 Honeycomb calcined body
111a, 111b, 121a, 121b, 131a, 131b, 141a, 141b Cell
113 Cell wall
115 Filter layer F Carrier gas
G₁ Exhaust gas

The invention claimed is:

1. A honeycomb filter comprising:
   a ceramic honeycomb substrate in which a multitude of cells through which a fluid flows are disposed in parallel in a longitudinal direction and are separated by cell walls, each cell being sealed at an end section at either a fluid inlet side or a fluid outlet side, and
   a filter layer which, among surfaces of the cell walls, is formed on a surface of the cell walls of those cells in which the end section at the fluid inlet side is open and the end section at the fluid outlet side is sealed, wherein the filter layer is composed of a plurality of spherical ceramic particles, and crosslinking bodies which bind the spherical ceramic particles to each other by crosslinking the spherical ceramic particles, and the spherical ceramic particles and the crosslinking bodies form a three-dimensional network structure, and
   pores are formed as a result of the spherical ceramic particles and the crosslinking bodies forming a three-dimensional network structure, and an average pore size of the pores is larger than an average particle size of the spherical ceramic particles.

2. The honeycomb filter according to claim 1, wherein the crosslinking bodies are rod-shaped bodies which exist between the spherical ceramic particles and have a shape that is narrower in a central portion than at both end portions that bind to the spherical ceramic particles.

3. The honeycomb filter according to claim 1, wherein the crosslinking bodies are formed by sintering of spherical ceramic particles with a relatively small particle size compared with an average particle size of the spherical ceramic particles.

4. The honeycomb filter according to claim 3, wherein an average particle size of the spherical ceramic particles with a relatively small particle size is less than 0.3 μm.

5. The honeycomb filter according to claim 1, wherein the filter layer is also additionally formed on a surface of the cell walls of cells in which the end section at the fluid outlet side is open and the end section at the fluid inlet side is sealed.

6. The honeycomb filter according to claim 1, wherein the spherical ceramic particles are heat-resistant oxide ceramic particles.

7. The honeycomb filter according to claim 6, wherein the heat-resistant oxide ceramic particles are at least one type selected from the group consisting of alumina, silica, mullite, ceria, zirconia, cordierite, zeolite, and titania.

* * * * *